Sept. 21, 1937. W. H. BASELT 2,093,798
CLASP BRAKE
Filed May 20, 1936 3 Sheets-Sheet 3

INVENTOR.
Walter H. Baselt.
BY
ATTORNEY

Patented Sept. 21, 1937

2,093,798

UNITED STATES PATENT OFFICE 2,093,798

CLASP BRAKE

Walter H. Baselt, Chicago, Ill., assignor to American Steel Foundries, Chicago, Ill., a corporation of New Jersey Application May 20, 1936, Serial No. 80,684

11 Claims. (Cl. 188—56)

This invention relates to railway brake equipment and particularly to the type known as clasp brakes where brake heads and brake shoes are applied to both sides of the car wheels.

An object of this invention is to provide such a clasp brake design for railway car trucks in which the operating parts will be arranged as simply and as compactly as possible.

A still further object is to provide a clasp brake rigging with a compact arrangement of operating parts and power means integrally formed within the load carrying member thus facilitating economy of space requirements.

Still another object is to provide a clasp brake rigging for railway car trucks in which the power means are integrally formed substantially along the longitudinal center line of the truck and centrally thereof in order that the various parts may be arranged most conveniently.

A still further object of this invention is to provide the clasp type brake rigging for railway trucks of the beam type which will also embody the feature of power means integrally formed within the load carrying member.

With these and various other objects in view, my invention may consist of certain novel features of construction and operation as will be more fully described and particularly pointed out in the specification, claims and drawings appended hereto.

In the drawings which illustrate embodiments of the device and wherein like reference characters are used to designate like parts—

Figure 1:
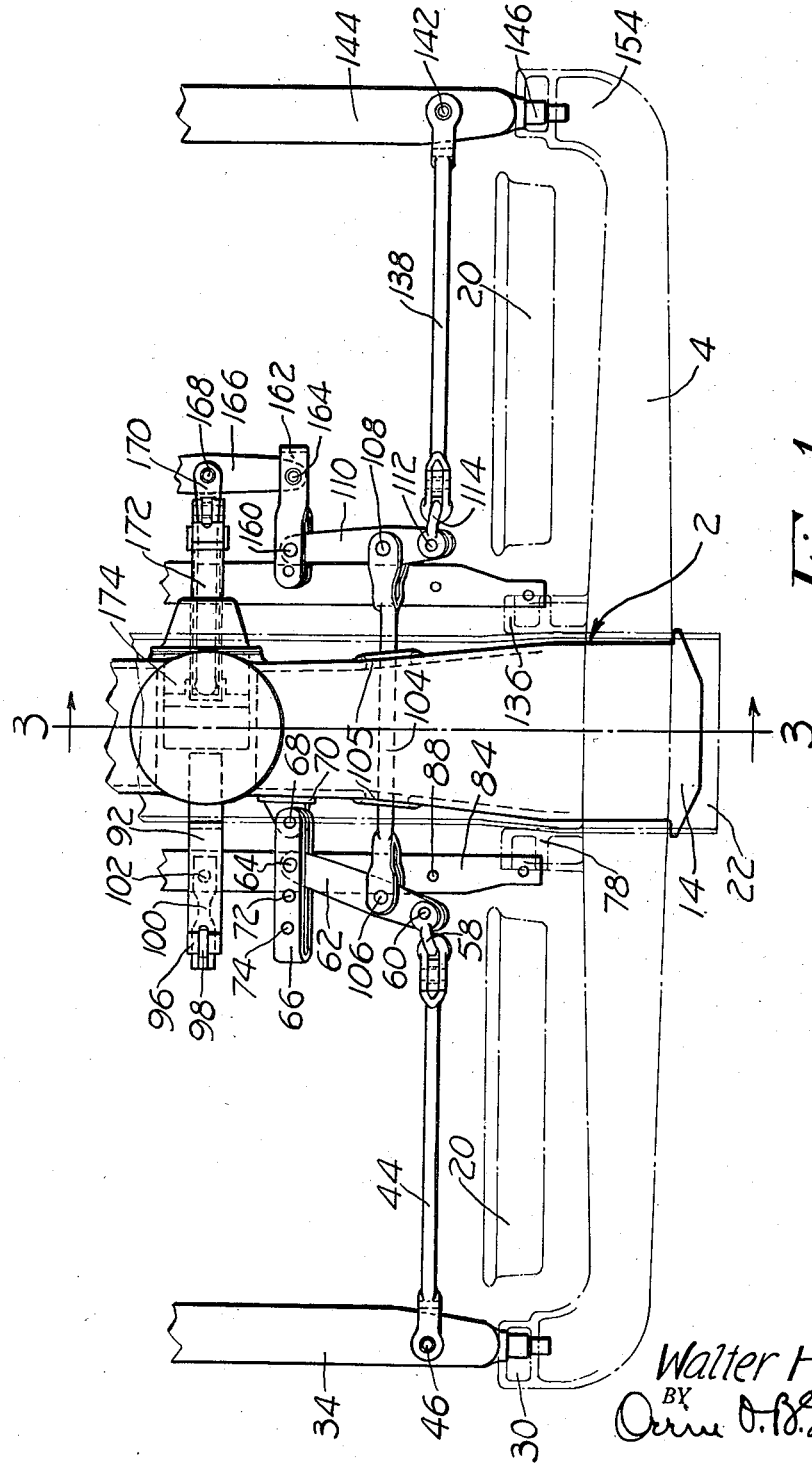
Figure 1 is a top plan view of a railway car truck embodying my invention, only half of the truck being shown inasmuch as the construction is similar on the two sides of the truck and it is believed that the simplicity thus attained will facilitate understanding of the structure involved.

Describing my invention in more detail, the car truck, generally designated as 2, has the side frames 4 commonly known as the truss type formed with the compression member 6 and the tension member 8 joined by the integral columns 10 forming therewith the window opening 12 within which may be received the load carrying member or bolster 14 in the usual manner. The compression member 6 and the tension member 8 of the side frame merge at their ends as at 16 to form pedestal jaws 18 for the reception of journal means (not shown) forming a part of the wheel and axle assembly 20. The side frames at the opposite sides of the truck are joined and secured in square relation by the spring plank 22 which also projects at each end through the window 12 of the opposite side frames and is secured thereto on the spring seat 24 in any suitable manner such as riveting.

In this embodiment of my invention the brake rigging is shown as consisting of the dead lever 26 pivotally supported at its upper end as at 28 from the inwardly turned bracket 30 integrally formed on the side frame 4. At an intermediate point as at 32 the dead truck lever 26 is pivotally mounted on the trunnion end 33 of the brake beam 34 and secured thereon by the nut 35. The brake head 36 with its associated brake shoe 38 is pivotally and adjustably supported as at 40 from the lower end of the dead lever 26 and the connector 42 is likewise pivotally secured at the point 40 to the brake head 36 as well as to the brake head at the opposite side of the truck, thus acting as spacing means.

The pull rod 44 is pivotally connected at one end as at 46 to the brake beam 34 by means of the jaw 48 within which the beam 34 is received. The intermediate portion of the pull rod 44 is offset upwardly and enlarged as at 50 in order to clear the axle of the adjacent wheel and axle assembly 20 and the opposite end of the pull rod 44 is pivotally connected as at 52 to an intermediate point of the live truck lever 54. The upper end of the live truck lever 54 is pivotally connected as at 56 to the clevis 58, the opposite end of which is pivotally connected as at 60 to one end of the diagonally arranged dead lever 62. The opposite end of the dead lever 62 is pivotally and adjustably connected as at 64 to the strap 66 which is pivotally fulcrumed as at 68 to the bracket 70 integrally formed or otherwise secured on the load carrying member or bolster 14. The strap 66 is of U-shape with its open end connected at 68 and provided with a number of aligned openings spaced from its closed end as at 64, 72 and 74 for adjustable connection with the dead lever 62. The hanger 76 is pivotally supported intermediate the wheels as at 77 from the bracket 78 integrally formed on the side frame 4. From the lower end of the hanger 76 as at 80 is pivotally supported the brake head 82 with its associated brake shoe 83. The brake head 82 is secured on the beam 84 and the fulcrum 86 is secured to the beam 84 as at 88 in alignment with the live truck lever 54 and is pivotally secured to said lever 54 as at 90. A third point support for the brake beam 84 is provided centrally thereof in the form of the spring bracket 92 which is secured to the spring plank 22 approximately at the center thereof as at 94 by riveting or other convenient securing means. The bracket 92 has the jaw 96 to which is pivotally connected the link 98, the lower end of which is pivotally connected to the fulcrum member 100 secured to the beam 84 approximately at its mid-point as at 102. The spring bracket 92, therefore, acts as a spring balancing means for the brake beam. A similar bracket 92 is secured in the same manner to similar parts and acts as balancing means for the brake beam intermediate the wheels at the opposite side of the truck.

The pull rod 104 extends through openings 105 in the load carrying member or bolster 14 and is pivotally and adjustably connected as at 106 to the obliquely arranged dead lever 62 and at its opposite end is pivotally and adjustably connected as at 108 to an intermediate point of the obliquely arranged live lever 110. The outer end of the live lever 110 is pivotally connected as at 112 to the clevis means 114, the opposite end of said clevis being pivotally connected as at 116 to the upper end of the live truck lever 118. The lower end of the live truck lever 118 is pivotally connected as at 120 to the fulcrum 122 which is secured to the brake beam 124 which supports the brake head 126 and its associated brake shoe 128. The hanger 130 is pivotally connected as at 132 to the brake head 126 and at its opposite end is pivotally connected as at 134 to the bracket 136 integrally formed on the side frame 4, thus acting as supporting means for the brake beam 124 and its brake heads and brake shoes.

The pull rod 138 is pivotally connected as at 140 to an intermediate point of the live truck lever 118 and at its opposite end is pivotally connected as at 142 to the brake beam 144. At an intermediate point the pull rod 138 is enlarged and offset upwardly in order to clear the axle of the adjacent wheel and axle assembly 20. The beam 124 like the beam 34 is formed with the trunnion end 146 to which is pivotally secured as at 148 by a nut 149 the dead truck lever 150 at a point intermediate its ends. The upper end of the dead lever is pivotally supported as at 152 from the inwardly turned bracket 154 integrally formed on the side frame 4. The lower end of the dead lever 150 has a pivotal and adjustable connection as at 154 to the brake head 156 with its associated brake shoe 158. A connector similar to the connector 42 at the opposite end of the truck is joined to the brake head 156 at the pivotal connection 154 and likewise to the brake head at the opposite side of the truck.

The inner end of the live lever 110 is pivotally and adjustably connected as at 160 to the open end of the U-shaped strap 162 and adjacent its opposite end the strap 162 has a pivotal connection as at 164 to one end of the equalizer 166. The mid-point of the equalizer is pivotally connected as at 168 to the projecting end 170 of the piston rod 172 forming part of the power means or cylinder 174 which is integrally formed within the bolster 14.

Figure 2:
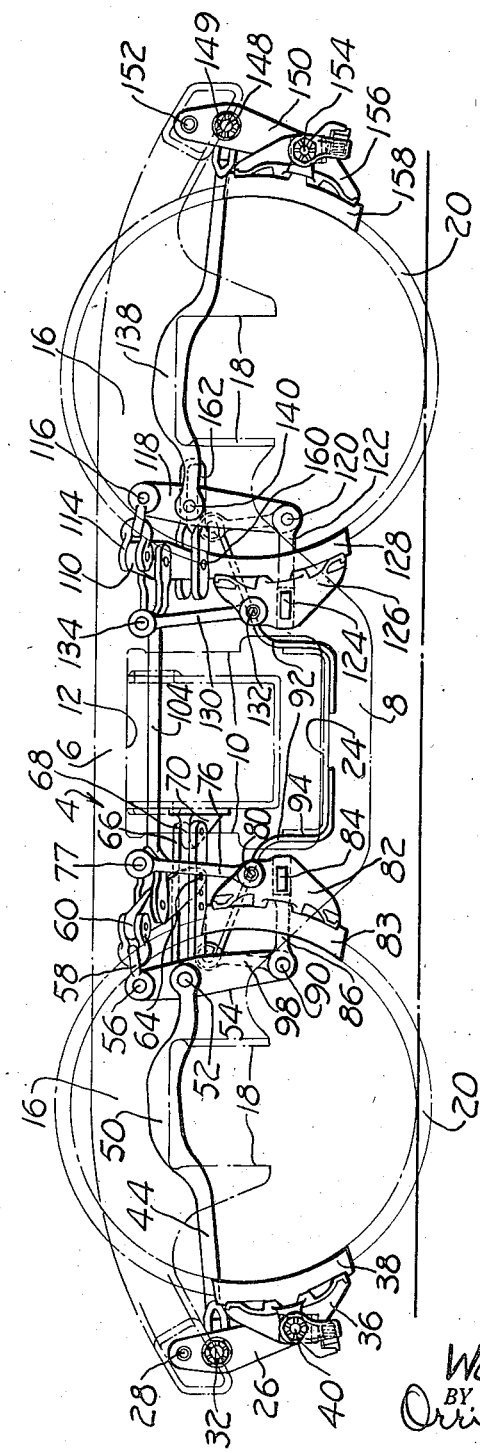
Figure 2 is a longitudinal side elevation of the truck construction shown in Figure 1.
Figure 3:
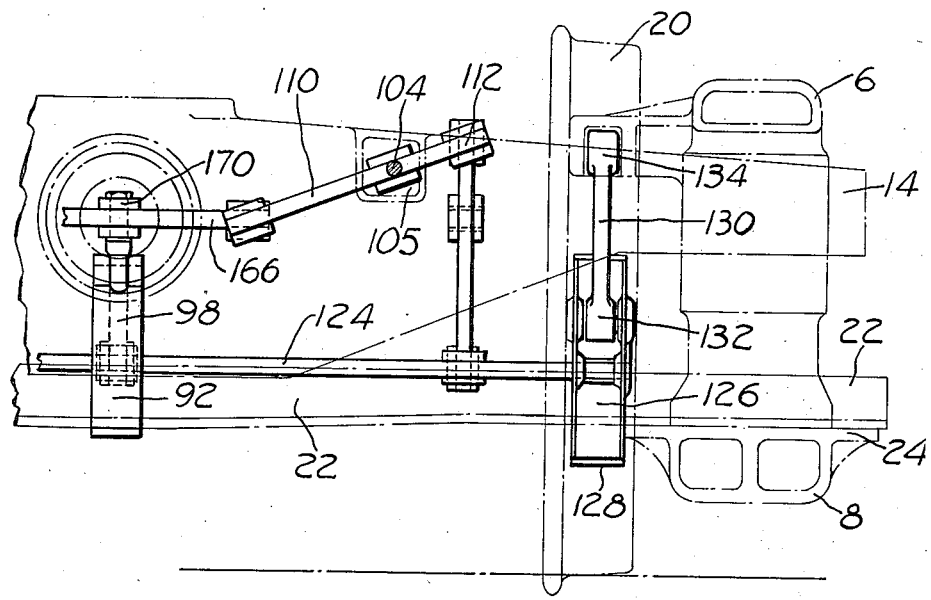
Figure 3 is a transverse sectional view of the truck construction shown in Figure 1, the section being taken substantially in the plane indicated by the line 3—3 of Figure 1.
Figure 4:
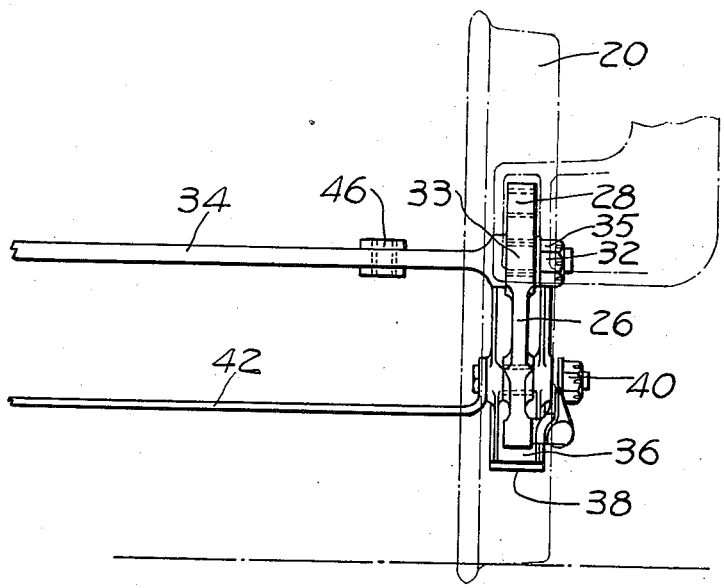
Figure 4 is an end elevation of the truck construction shown in Figures 1 and 2, the view being taken at the left end as viewed in those figures.

In operation actuation of the power means 174 will cause movement of the piston 172 toward the right as viewed in Figure 1 thus causing outward movement of the equalizer 166. Movement of the equalizer 166 will cause the live lever 110 to rotate clockwise about the pivot point 108 thus moving to the left the upper end of the live truck lever 118 and causing the lever 118 to rotate in a counter-clockwise direction about the pivot 140 bringing the brake shoe 128 into engagement with the periphery of the associated car wheel. Continued movement of the live lever 118 will cause it to rotate in a counter-clockwise direction about the pivot 120 thus moving the pull rod 138 to the left as viewed in Figures 1 and 2 and bringing the brake shoe 158 into engagement with the opposite side of said car wheel by causing the dead lever 150 to rotate in a clockwise direction about the pivot point 152.

Continued movement of the equalizer 166 to the right as viewed in Figure 1 will cause the live lever 110 to move in a clockwise direction about the pivot 112 thus causing the pull rod 104 to move to the right and rotate the dead lever 62 in a counter-clockwise direction about the point 64. This movement of the dead lever 62 rotates the live truck lever 54 in a clockwise direction about the pivot point 52 thus bringing the brake shoe 83 into engagement with the periphery of the associated wheel. Further movement rotates the live truck lever 54 in a clockwise direction about the pivot 90 causing the pull rod 50 to be moved to the right and rotating the dead truck lever 26 in a counter-clockwise direction about the pivot point 28 whereby the brake shoe 38 is brought into engagement with said wheel at its opposite side.

Slack take-up in this brake rigging is provided for by the adjustable connections between the dead lever 62 and the strap 66; likewise, between the lever 110 and the strap 162 at the opposite side of the truck.

It is to be understood that I do not wish to be limited by the exact embodiments of the device shown, which are merely by way of illustration and not limitation, as various and other forms of the device will of course be apparent to those skilled in the art without departing from the spirit of the invention or the scope of the claims.

I claim:

1. In a railway car truck the combination of a truck frame comprising a load carrying member with power means integrally formed therein, spaced wheel and axle assemblies disposed in supporting relation to said truck frame and braking means associated with each of said assemblies, said means comprising hanger levers supporting brake heads and a brake beam on one side thereof, hangers supporting brake heads and a brake beam on the opposite side thereof, live levers fulcrumed from one of said beams and operatively connected to the other of said beams, auxiliary levers connected to the upper ends of said live levers, the auxiliary levers for one of said braking means being fulcrumed from said load carrying member and the auxiliary levers for the other of said beams having an operative connection with said power means, and spaced connecting means passing through said load carrying member and operatively connecting one of said braking means to the other of said braking means whereby both of said braking means are operated by said power means.

2. In a four wheel railway car truck the combination of a truck frame comprising a transverse load carrying member having power means integrally formed therein adjacent the longitudinal center line of said truck, spaced wheel and axle assemblies disposed in supporting relation to said truck frame, braking means associated with each of said assemblies, said braking means comprising hanger levers supporting a brake beam on one side of said assembly, hangers supporting a brake beam on the opposite side of said assembly, live levers fulcrumed from said last mentioned beam and operatively connected to said first mentioned beam, auxiliary levers connected to the upper ends of said live levers, said auxiliary levers for one of said braking means having their opposite ends fulcrumed from said load carrying member and said auxiliary levers for the other of said braking means having their opposite ends connected to an equalizer, said equalizer having an operative connection with said power means, and spaced pull rods extending through said load carrying member and operatively connected respectively to said braking means.

3. In a brake rigging for a four wheel railway car truck the combination of a truck frame comprising a load carrying member having integrally formed power means, spaced wheel and axle assemblies, braking means associated with each of said assemblies, said means comprising hanger levers supporting a brake beam outwardly thereof, hangers supporting a brake beam inwardly thereof, live levers fulcrumed from said last mentioned beam and operatively connected intermediate their ends to said first mentioned beam, and auxiliary levers having their outer ends connected to said live levers, said auxiliary levers associated with one of said braking means having their opposite ends fulcrumed from said load carrying member and said auxiliary levers associated with the other of said braking means having their inner ends operatively connected to said power means, and spaced connecting means extending through said load carrying member and connecting one of said braking means to the other of said braking means whereby said power means operates both of said braking means.

4. In a brake rigging for a four wheel railway car truck the combination of a truck frame comprising a bolster having an integrally formed brake cylinder, spaced wheel and axle assemblies, and braking means associated with each of said assemblies, said braking means comprising hanger levers supporting a brake beam on one side of said assembly, hangers supporting a brake beam on the opposite side of said assembly, live levers fulcrumed from said last mentioned beam, pull rods connecting said hanger levers and said live levers at points intermediate their ends, and a pair of auxiliary levers having their outer ends connected to the upper ends of said live levers, and spaced connecting means passing through said bolster and connecting the auxiliary levers associated with one of said braking means to the auxiliary levers associated with the other of said braking means below the upper level of said bolster, one pair of said auxiliary levers being fulcrumed from said bolster and the other pair of said auxiliary levers being operatively connected to said brake cylinder.

5. In a four wheel railway car truck the combination of a truck frame comprising a transverse load carrying member having integrally formed power means, spaced wheel and axle assemblies, brake rigging disposed below the upper level of said load carrying member, said rigging comprising braking means associated with each of said assemblies, said braking means including hanger levers supporting a brake beam on one side of said assembly, hangers supporting a brake beam on the opposite side of said assembly, live levers fulcrumed from said last mentioned beam and operatively connected to said first mentioned beam, and a pair of auxiliary levers having their outer ends connected respectively to said live levers, one pair of said auxiliary levers having their inner ends fulcrumed from said load carrying member and the other pair of said auxiliary levers having their inner ends operatively connected to said power means, and spaced connection means passing through said load carrying member and connecting the respective auxiliary levers associated with one of said braking means to the auxiliary levers associated with the other of said braking means.

6. In a four wheel railway car truck the combination of a truck frame comprising a transverse load carrying member having integrally formed power means, spaced wheel and axle assemblies, braking means associated with each of said assemblies and disposed below the upper level of said load carrying member, said braking means comprising brake beams on opposite sides of said assembly, vertical levers fulcrumed from one of said beams and operatively connected to the other of said beams and a pair of auxiliary levers connected respectively to said vertical levers, and spaced connecting means passing through said load carrying member and connecting the corresponding auxiliary levers of said respective braking means, one pair of said auxiliary levers being fulcrumed from said load carrying member and the other pair of said auxiliary levers having operative connections to said power means.

7. In a four wheel railway car truck, a truck frame including a transverse load carrying member having integrally formed power means, spaced wheel and axle assemblies, braking means associated with each of said assemblies and disposed below the upper level of said load carrying member, said means including spaced auxiliary levers, the auxiliary levers associated with one of said braking means being fulcrumed from said load carrying member and the auxiliary levers associated with the other of said braking means being operatively connected to said power means, and spaced connecting means passing through said load carrying member and connecting the corresponding auxiliary levers of said braking means respectively, whereby both of said braking means are operated by said power means.

8. In a four wheel railway car truck the combination of a truck frame having a transverse load carrying member with integrally formed power means, spaced wheel and axle assemblies, brake rigging associated with each of said assemblies and located below the upper level of said load carrying member, an operative connection between one of said braking means and said power means, and spaced connecting means passing through said load carrying member on opposite sides of said power means and serving to connect the braking means associated with one wheel and axle assembly to the braking means associated with the other wheel and axle assembly.

9. In a railway car truck, a truck frame having a transverse load carrying member with integrally formed power means, spaced wheel and axle assemblies, brake rigging associated with each assembly, said rigging comprising brake beams on opposite sides thereof, live levers fulcrumed from one of said beams and operatively connected to the other of said beams, auxiliary levers connected to said live levers, an operative connection between said power means and the auxiliary levers associated with one of said brake riggings, and spaced connecting means passing through said load carrying member on opposite sides of said power means and connecting said last mentioned auxiliary levers respectively with the corresponding auxiliary levers associated with another of said riggings.

10. In a railway car truck, a truck frame including a transverse bolster with an integrally formed brake cylinder, spaced wheel and axle assemblies, braking means associated with each of said assemblies and including brake beams on opposite sides thereof, live levers fulcrumed adjacent the opposite ends of one of said beams and having their upper ends connected respectively to auxiliary levers, the auxiliary levers of one braking means being fulcrumed from said bolster on opposite sides of said cylinder and the auxiliary levers of the other braking means having their opposite ends connected to the opposite ends of an equalizer, an operative connection between said cylinder and said equalizer, and connecting means passing through said bolster on opposite sides of said cylinder and connecting corresponding auxiliary levers of said respective braking means.

11. In a four wheel railway car truck, a truck frame having a transverse load carrying member with integrally formed power means, spaced wheel and axle assemblies, braking means associated with each of said assemblies and comprising spaced auxiliary levers, one set of said auxiliary levers being fulcrumed from said load carrying member on opposite sides of said power means, the other set of said auxiliary levers being operatively connected to the piston of said power means, and spaced connecting means passing through said load carrying member on opposite sides of said power means and connecting the corresponding auxiliary levers associated with the respective braking means.

WALTER H. BASELT.